(12) United States Patent
Drake et al.

(10) Patent No.: US 10,140,649 B2
(45) Date of Patent: Nov. 27, 2018

(54) PROXIMITY DEVICE FOR CONTENT CONFIGURATION

(71) Applicant: Disney Enterprises, Inc., Burbank, CA (US)

(72) Inventors: Edward Drake, Stevenson Ranch, CA (US); Evan Acosta, La Crescenta, CA (US); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1122 days.

(21) Appl. No.: 13/944,823

(22) Filed: Jul. 17, 2013

(65) Prior Publication Data

US 2014/0236769 A1  Aug. 21, 2014

Related U.S. Application Data

(60) Provisional application No. 61/766,065, filed on Feb. 18, 2013.

(51) Int. Cl.
*G06Q 30/00* (2012.01)
*G06Q 30/06* (2012.01)
(Continued)

(52) U.S. Cl.
CPC ....... *G06Q 30/0641* (2013.01); *G06F 3/1423* (2013.01); *G06F 3/1438* (2013.01);
(Continued)

(58) Field of Classification Search
CPC ........... G06Q 30/0641; G06Q 30/0631; G06Q 30/0639; G06Q 30/0269; G06Q 30/0261;
(Continued)

(56) References Cited

U.S. PATENT DOCUMENTS

| 5,986,675 A | 11/1999 | Anderson et al. |
| 6,222,807 B1 | 4/2001 | Min-Jae |

(Continued)

FOREIGN PATENT DOCUMENTS

| CN | 101312514 | 11/2008 |
| WO | 2002071285 | 9/2002 |

OTHER PUBLICATIONS

"Adding sense to the Internet of Things: An architecture framework for Smart Object systems," by Tomas Sanchez Lopez, Damith C. Ranasinghe, Mark Harrison, and Duncan McFarlane, Personal and Ubiquitous Computing (2012) 16: 291-308 (Year: 2012).*

(Continued)

*Primary Examiner* — Anne M Georgalas
(74) *Attorney, Agent, or Firm* — Patent Ingenuity, P.C.; Samuel K. Simpson

(57) ABSTRACT

An update proximity-based device configures a product and/or product package proximity-based device. The product and/or product package proximity-based device is located within a product and/or a product package such that an update is performed upon the product and/or the product package after the update proximity-based device is placed within a proximity to the product and/or product package proximity-based device.

14 Claims, 4 Drawing Sheets

(51) Int. Cl.
- *G06Q 30/02* (2012.01)
- *H04W 4/00* (2018.01)
- *G06F 8/60* (2018.01)
- *G06F 8/65* (2018.01)
- *G06F 3/14* (2006.01)

(52) U.S. Cl.
CPC .............. *G06F 8/60* (2013.01); *G06F 8/65* (2013.01); *G06Q 30/0261* (2013.01); *G06Q 30/0267* (2013.01); *G06Q 30/0269* (2013.01); *G06Q 30/0623* (2013.01); *G06Q 30/0625* (2013.01); *G06Q 30/0631* (2013.01); *G06Q 30/0639* (2013.01); *H04W 4/00* (2013.01); *G09G 2370/04* (2013.01); *G09G 2370/10* (2013.01); *G09G 2370/16* (2013.01)

(58) Field of Classification Search
CPC ........... G06Q 30/0267; G06Q 30/0623; G06Q 30/0625; G06F 8/60; G06F 8/65; G06F 3/1423; G06F 3/1438; G09G 2370/04; G09G 2370/10; G09G 2370/16; H04W 4/00

See application file for complete search history.

(56) References Cited

U.S. PATENT DOCUMENTS

| | | | |
|---|---|---|---|
| 7,152,040 B1* | 12/2006 | Hawthorne | G06Q 10/087 235/380 |
| 7,663,488 B2 | 2/2010 | Kalama et al. | |
| 8,010,621 B2 | 8/2011 | Zilliacus et al. | |
| 8,762,704 B2* | 6/2014 | Rothkopf | G06F 1/1626 206/320 |
| 2002/0013144 A1 | 1/2002 | Waters | G09F 3/00 455/414.1 |
| 2003/0040922 A1* | 2/2003 | Bodin | G06Q 10/087 705/1.1 |
| 2005/0111825 A1 | 5/2005 | Yun | |
| 2007/0037614 A1 | 2/2007 | Rosenburg | |
| 2007/0049296 A1* | 3/2007 | Gupta | H04W 4/023 455/456.5 |
| 2007/0131764 A1* | 6/2007 | Wallace | G06K 17/0022 235/383 |
| 2007/0159298 A1* | 7/2007 | Zegelin | G06K 17/0022 340/5.91 |
| 2007/0254674 A1 | 11/2007 | Pedigo | |
| 2007/0262849 A1* | 11/2007 | Ismail | G06K 7/0008 340/10.1 |
| 2008/0109309 A1 | 5/2008 | Landau et al. | |
| 2008/0134032 A1 | 6/2008 | Pirnack | |
| 2009/0085724 A1 | 4/2009 | Naressi et al. | |
| 2009/0157449 A1 | 6/2009 | Itani | |
| 2010/0004988 A1 | 1/2010 | Matsuo | |
| 2010/0010964 A1 | 1/2010 | Skowronek et al. | |
| 2010/0114983 A1 | 5/2010 | Robert et al. | |
| 2010/0136898 A1 | 6/2010 | Farrow | |
| 2010/0161434 A1 | 6/2010 | Herwig | |
| 2010/0174599 A1 | 7/2010 | Rosenblatt et al. | |
| 2010/0300913 A1 | 12/2010 | Goldburt | |
| 2011/0016023 A1 | 1/2011 | Zakas | |
| 2011/0112917 A1 | 5/2011 | Driessen | |
| 2011/0140993 A1 | 6/2011 | Bess | |
| 2011/0288938 A1 | 11/2011 | Cook | |
| 2011/0299830 A1 | 12/2011 | Sasaki | |
| 2011/0320278 A1 | 12/2011 | Littman | |
| 2012/0062475 A1 | 3/2012 | Locker | |
| 2012/0077584 A1 | 3/2012 | Sarmenta | |
| 2012/0101885 A1 | 4/2012 | Lee | |
| 2012/0155380 A1 | 6/2012 | Hodges | |
| 2012/0218089 A1 | 6/2012 | Hill | |
| 2012/0208592 A1 | 8/2012 | Davis | |
| 2012/0220220 A1 | 8/2012 | DeLuca et al. | |
| 2012/0220221 A1 | 8/2012 | Moosavi et al. | |
| 2012/0224743 A1 | 9/2012 | Rodriquez et al. | |
| 2012/0226573 A1 | 9/2012 | Zakas | |
| 2012/0245988 A1 | 9/2012 | Pace | |
| 2012/0271712 A1 | 10/2012 | Katzin et al. | |
| 2012/0271717 A1 | 10/2012 | Postrel | |
| 2012/0290377 A1 | 11/2012 | Itani | |
| 2013/0002405 A1* | 1/2013 | Pesonen | H04Q 9/00 340/10.5 |
| 2013/0006869 A1 | 1/2013 | Grab et al. | |
| 2013/0106684 A1 | 5/2013 | Weast et al. | |
| 2013/0109323 A1* | 5/2013 | Ruutu | H04B 5/0031 455/68 |
| 2013/0181886 A1 | 7/2013 | Hill | |
| 2013/0185137 A1 | 7/2013 | Shafi | |
| 2013/0217336 A1* | 8/2013 | McCormack | H04W 8/085 455/41.2 |
| 2013/0237147 A1 | 9/2013 | Dearman | |
| 2013/0300637 A1 | 11/2013 | Smits et al. | |
| 2013/0326495 A1* | 12/2013 | Reunamaki | G06F 8/65 717/173 |
| 2014/0113549 A1* | 4/2014 | Beg | H04W 4/008 455/41.1 |
| 2014/0131452 A1 | 5/2014 | Testanero | |

OTHER PUBLICATIONS http://www.youtube.com/watch?v=f43NGb8XRK4, Feb. 19, 2012.

* cited by examiner

PROXIMITY DEVICE FOR CONTENT CONFIGURATION

RELATED APPLICATIONS

This application claims priority to U.S. Provisional Patent Application Ser. No. 61/766,065, filed on Feb. 18, 2013, entitled TRANSFERENCE OF DATA TO PROVIDE CONTENT, which is hereby incorporated by reference in its entirety.

BACKGROUND

1. Field

This disclosure generally relates to the field of data transference.

2. General Background

Media products are typically placed in packages on store shelves that allow consumers to read information about the content of the media products. Examples of such media products are Blu-ray discs or DVDs with movies, television shows, video games, or the like. Consumers typically peruse different packages to find out more information about the products of potential interest.

Current configurations of media content packages are limited in the amount of information that they provide to users through an in-store experience. For example, users are often limited to reading information on a package about a particular DVD of interest. Users are not provided with additional content experiences that help incentivize interest in possible purchase of the product. As a result, users are more frequently deciding to purchase products online instead of purchasing products in a store environment.

SUMMARY

A process configures, with an update proximity-based device, a product and/or product package proximity-based device within a product and/or a product package when the update proximity-based device is placed within a proximity to the product and/or product package proximity-based device.

Further, a computer program product comprises a computer readable storage device. The computer readable storage device comprises a computer readable program stored thereon. The computer readable program when executed on a computer causes the computer to configure, with an update proximity-based device, a product and/or product package proximity-based device within a product and/or a product package when the update proximity-based device is placed within a proximity to the product and/or product package proximity-based device.

The apparatus includes an update proximity-based device that configures a product and/or product package proximity-based device within a product and/or a product package when the update proximity-based device is placed within a proximity to the product and/or product package proximity-based device.

BRIEF DESCRIPTION OF THE DRAWINGS

The above-mentioned features of the present disclosure will become more apparent with reference to the following description and accompanying drawings, wherein like reference numerals denote like elements and in which.

DETAILED DESCRIPTION

A proximity-based update configuration allows for various types of updates to a product and/or product package. The product may be a media product, e.g., a Blu-ray disc, DVD, video game, or the like. Alternatively, the product may be an entertainment product that is not a media product, e.g., an action figure, a doll, or the like.

An update may be performed by an update proximity-based device such as a mobile device, e.g., smartphone, tablet device, wearable computing device, or the like, that is in proximity to the product and/or product package. Upon detection of the product and/or product package within a particular proximity, the update proximity-based device may send an update to the product and/or product package. The update may be a content update, a physical update to the product and/or product package (such as changing an appearance of the product and/or package), or the like.

Figure 1:
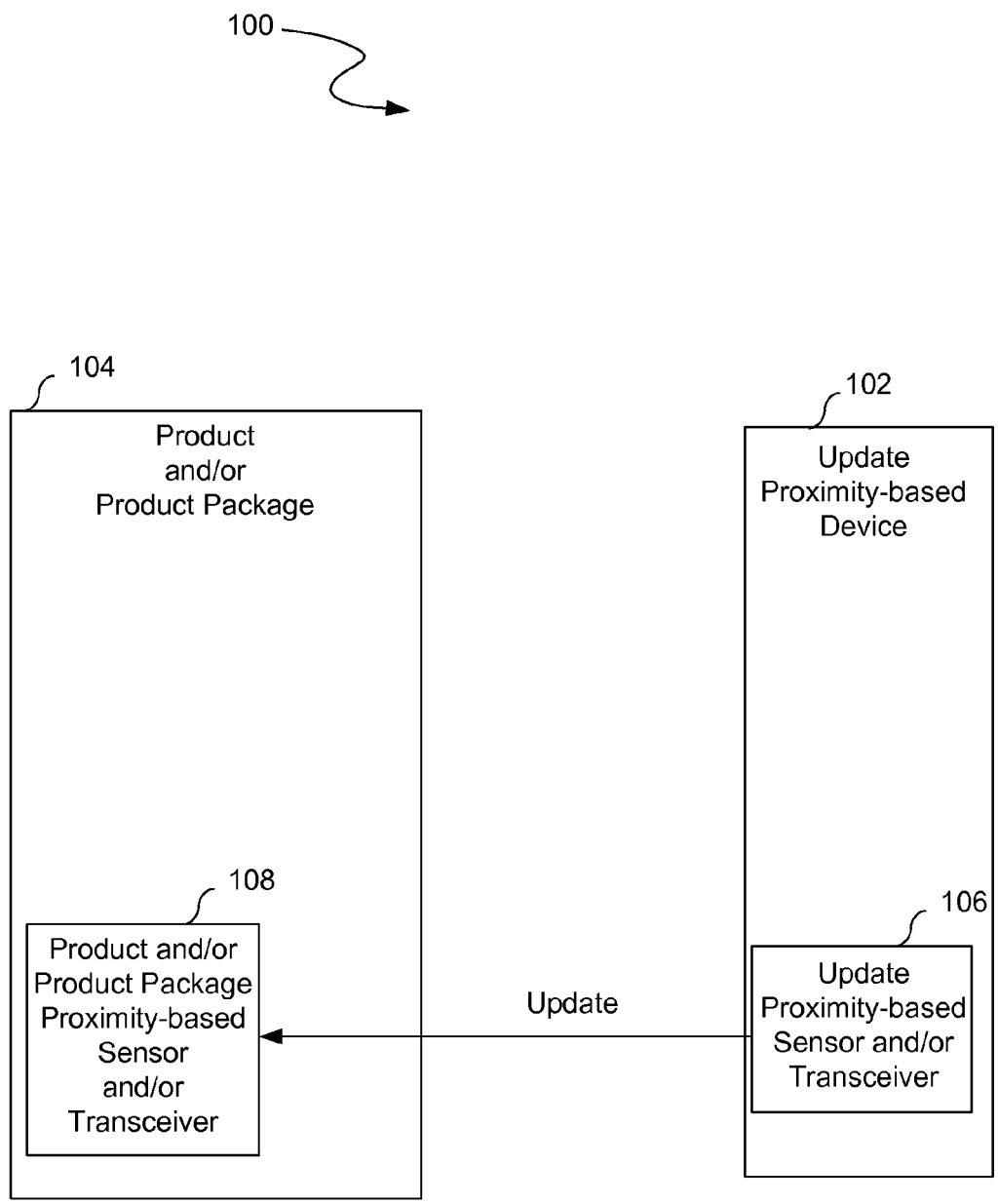
FIG. 1 illustrates a proximity-based update configuration that allows for an update based upon proximity-based detection.

FIG. 1 illustrates a proximity-based update configuration 100 that allows for an update based upon proximity-based detection. The proximity-based update configuration 100 includes an update proximity-based device 102 and a product and/or product package 104. The product and/or product package 104 may be placed on store shelves, in an amusement park, a movie theater, and/or in various entertainment environments. The product package 104 may have various information, e.g., pictures, text, or the like, on different portions of the product package 104 so that the user may learn about the product 104 prior to purchase.

In one aspect, the update proximity-based device 102 (such as a mobile phone or tablet computer) has an update proximity-based sensor and/or transceiver 106, e.g., RFID chip, RFID tag, Near Field Communication ("NFC") chip, NFC tag, BLUETOOTH, or the like. The update proximity-based sensor and/or transceiver 106 may establish radio or other communication with another device based upon one or more standards, e.g., NFC standards.

Further, the product and/or product package 104 has a product and/or product package proximity-based sensor and/or transceiver 108, e.g., RFID chip, RFID tag, NFC chip, NFC tag, BLUETOOTH, or the like. The product and/or product package proximity-based sensor and/or transceiver 108 may establish radio or other communication with another device based upon one or more standards, e.g., NFC standards.

The update proximity-based sensor and/or transceiver 106 detects the presence of the product and/or product package proximity-based sensor and/or transceiver 108 when the product and/or product package proximity-based sensor and/or transceiver 108 is within a proximity to the update proximity-based sensor and/or transceiver 106. The proximity may be a predefined proximity. The update proximity-based sensor and/or transceiver 106 may then send an update to the product and/or product package proximity-based sensor and/or transceiver 108.

In one aspect, the update is a rule (or modification of a rule) that is imposed upon content stored in the product and/or product package proximity-based sensor and/or transceiver 108. For example, the rule may be a content life cycle rule that is fixed. The fixed content life cycle rule prevents transmission of the content from the product and/or product package proximity-based sensor and/or transceiver 108 to a computing device (such as a mobile phone) after expiration of a static period of time. For instance, a user may be able to obtain static life cycle content from the product and/or product package proximity-based sensor and/or transceiver 108 with a computing device. The user may only be able to obtain that static life cycle content for a fixed period of time. The static life cycle content may be automatically deleted by the product and/or product package proximity-based sensor and/or transceiver 108 after expiration of the fixed period of time.

In yet another aspect, additional static life cycle content is displayed after expiration of the initial static content. In other words, a rotation of static life cycle content may be utilized. For instance an initial set of static life cycle content may expire. Additional static life cycle content may then be displayed until expiration or without a time restriction.

The update is not limited to static life cycle content. In one aspect, the content may be dynamic life cycle content that is not restricted by a fixed period of time. In other words, the time period for expiration may be changed by an update from the update proximity-based sensor and/or transceiver 106.

The content stored in the product and/or product package proximity-based sensor and/or transceiver 108 and provided to a user of a mobile device (device 102 or other devices) may include bonus footage of a movie, bonus games, promotions, coupons, special offers, a video (such as a video involving an action figure and/or a movie), music (such as music corresponding to an action figure and/or a movie), an offer to purchase a digital copy of a movie (such as with a movie character corresponding to an action figure), additional information, or the like. Although the updates provided for herein may be utilized to update content stored by the product and/or product package 104, the updates may update other properties of the product and/or product package 104.

In one aspect, an image or appearance of the product and/or product package 104 can change after the update, e.g., the chemical ink in the color may be changed to change the color of the package, the e-ink may be changed, the chemical scent may be changed, an associated sound may be changed, or the like. For instance, the content for marketing and/or appearance of signs and/or products may be changed for holidays, events, or the like. As an example, a low powered servo may be positioned on the product and/or product package 104. The update may include a command that triggers a chemical burst, a change in e-ink, a change in smell, or the like.

In another aspect, the update is a trigger or a beacon that updates content on multiple product and/or product package proximity-based sensors and/or transceivers 108 (i.e., cascade) according to a similarity configuration. For example, all NFC chips in all similar product packages, toys, signs, or the like in a given area, e.g., a rack, aisle, or the like, may be updated to have the same content, appearance, or the like. The update may include a product identifier that identifies the product and/or a location identifier that identifies the location. As another example, the update proximity-based device 102 may be utilized to update a plurality of tablet devices in a store or a factory with new content or a particular setting, such as a language. As yet another example, the update may be a reset to a factory setting.

In yet another aspect, the update comprises code with an instruction to perform the update on other devices. For example, the update proximity-based device 102 may send a particular tablet device an update for a particular language along with code that instructs the tablet device to then send that update to another tablet device in proximity. A cascading effect results that allows for updates across multiple devices. In other words, active carriers in proximity may be utilized to opportunistically update themselves with the update.

In one aspect, the product and/or product package 104 and other products and/or product packages may have a power source that is utilized to generate a Load Modulating Field. The Load Modulating Field is utilized to perform the cascading update. In one configuration, the power source is installed within the product and/or product package 104 and other products and/or product packages. Alternatively, the power source may be installed externally to the product and/or product package 104 and other products and/or product packages. In such configuration, the power source may provide power wirelessly or through a wireline connection. For example, the power source may be installed in a shelf on which the product and/or product package 104 and other products and/or product packages are located. The power source may then provide power wirelessly or through a wireline connection to the product and/or product package 104 and other products and/or product packages so that a cascading update may be performed.

Figure 2:
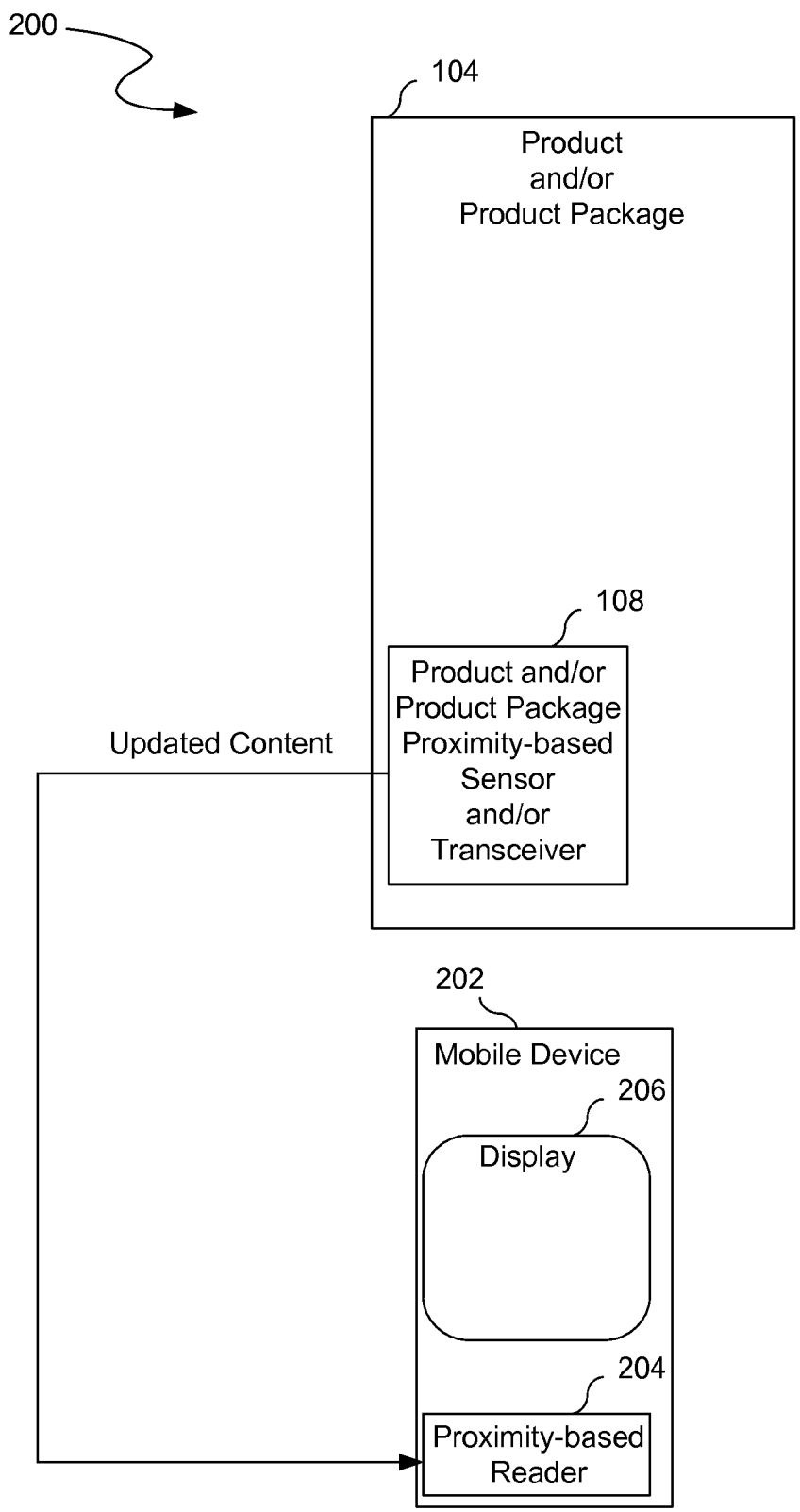
FIG. 2 illustrates a data transference configuration that is utilized to provide content that is updated according to the proximity-based update configuration to a user.

FIG. 2 illustrates a data transference configuration 200 that is utilized to provide content after being updated according to the proximity-based update configuration 100 of FIG. 1 to a user. The data transference configuration 200 includes the product and/or product package 104 illustrated in FIG. 1 and a mobile device 202. In one aspect, a proximity-based reader 204 in the mobile device 202 detects the presence of the product and/or product package proximity-based sensor and/or transceiver 108 within a proximity and receives the updated content based upon that detection. The mobile device 202 may then display the updated content on a display 206, e.g., a display screen that is integrated within the mobile device 202 or is in operable communication with the mobile device 202.

In one aspect, the product and/or product package proximity-based sensor and/or transceiver 108 may send static life cycle content and/or dynamic life cycle content to the mobile device 202. Accordingly, the static life cycle content may expire after a fixed period of time and may not be available to the user after that fixed period of time. Further, the dynamic life cycle content may expire after a period of time that is not fixed. In an alternative aspect, the product and/or product package 104 has a static life cycle content proximity-based sensor and/or transceiver and a dynamic life cycle content proximity-based sensor and/or transceiver. Accordingly, the static life cycle content proximity-based sensor sends updates to the static life cycle content, whereas the dynamic life cycle content proximity-based sensor and/or transceiver sends updates to the dynamic life cycle content.

Although a mobile device 202 is illustrated in FIG. 2, other types of devices may be utilized. For example, a stationary device such as a kiosk may be utilized instead of the mobile device 202. The product and/or product package 104 may then be brought to within proximity of the kiosk so that the kiosk may display the content.

Further, the mobile device 202 does not have to receive all of the updated content from the product and/or product package proximity-based sensor and/or transceiver 108. For example, the product and/or product package proximity-based sensor and/or transceiver 108 may send a portion of the content to the mobile device 202 along with a Uniform Resource Locator ("URL") or other link to a server. The mobile device 202 may then request the remainder of the content from the server.

Although FIG. 2 illustrates a configuration in which content after a proximity-based update is available through subsequent and distinct proximity-based detection, the proximity-based update may be available without subsequent and distinct proximity-based detection. For example, the physical attributes of the product and/or product package 104 may be updated, a playback attribute such as language may be updated, or the like, according to a proximity-based update without a proximity-based playback. The playback of the content may be performed by inserting the product 104 within the product package 104 into a playback device such as a DVD player, Blu-ray disc player, or the like.

Further, the update may have a deep link that allows the mobile device 202 to obtain content that triggers an experience on a software application stored on the mobile device 202. For example, the content may be a movie preview of the product 104 stored within the product package 104. The movie preview may have a deep link that triggers an additional experience, e.g., a bonus game, after the mobile device obtains the movie preview and shows the additional experience in a software application stored on the mobile device 202. A bonus game is just an example as the additional experience may be a variety of types of additional content experiences.

The update may also be utilized to update multiple devices. For example, a user may want to update a store or factory aisle of tablet devices to have a language setting of English. In contrast with the user having to place the update proximity-based device 102 illustrated in FIG. 1 in proximity to each of the tablet devices, the user may place the update proximity-based device 102 within proximity to one of the tablet devices.

Figure 3:
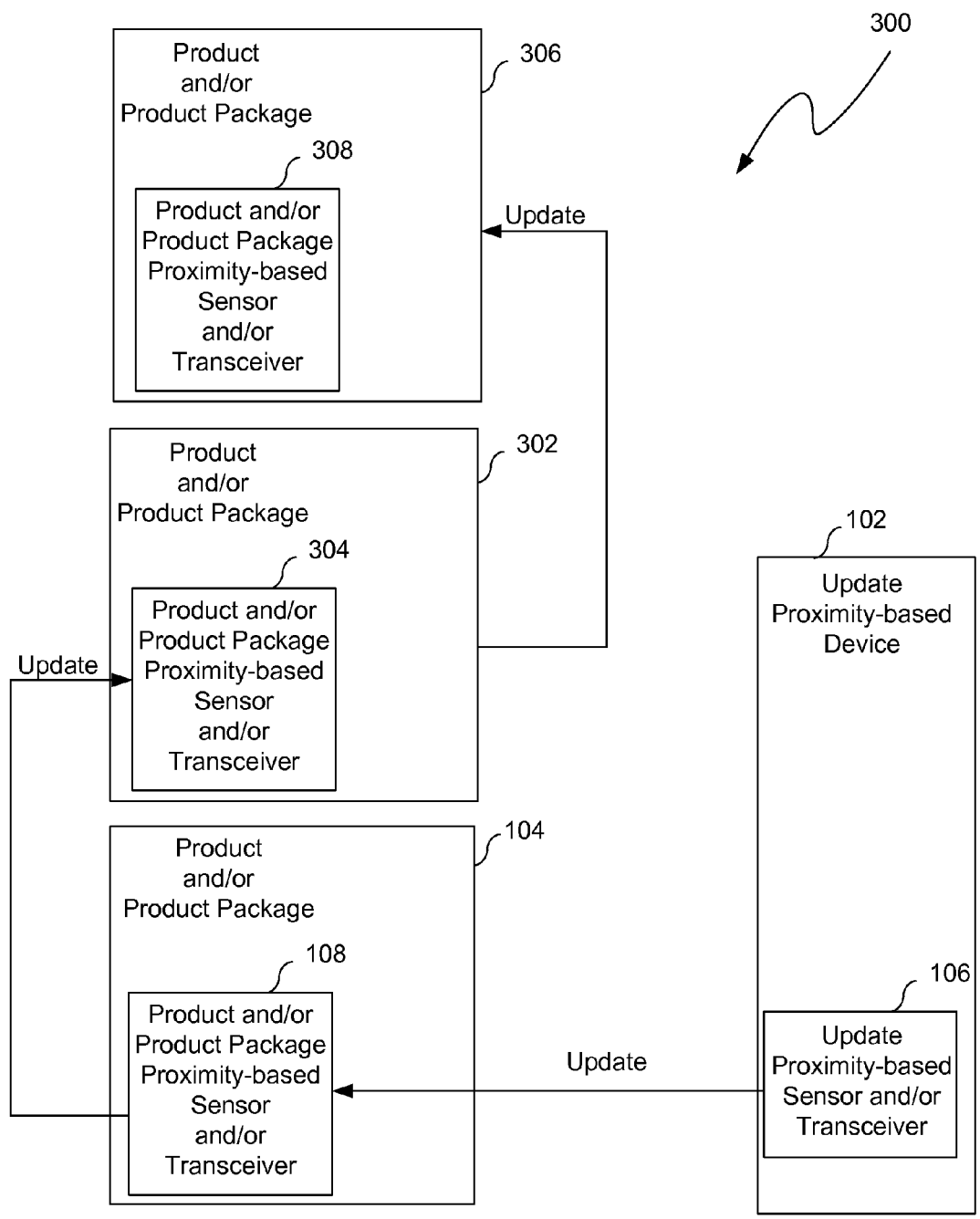
FIG. 3 illustrates an update cascading configuration that sends the update to various products and/or product packages to allow for opportunistic self updating by the various proximity-based devices.

FIG. 3 illustrates an update cascading configuration 300 that sends the update to various products and/or product packages 104, 302, 306 to allow for opportunistic self updating by the various proximity-based devices 104, 302, 306.

The update cascading configuration 300 provides an example of the update proximity-based device 102 providing an update from the update proximity-based sensor and/or transceiver 106 to the product and/or product package proximity-based sensor and/or transceiver 108 in the product and/or product package 104. The update is then sent to product packages 302 and 306. In one aspect, the update includes code with an instruction to send the update to other devices within a proximity. The product and/or product package proximity-based sensor and/or transceiver 108 in the product and/or package 104 then sends the update according to the instruction to a product and/or product package proximity-based sensor and/or transceiver 304 in the product and/or package 302. Further, the product and/or product package proximity-based sensor and/or transceiver 304 in the product and/or package 302 then sends the update according to the instruction to a product and/or product package proximity-based sensor and/or transceiver 308 in the product and/or package 306. Accordingly, the updates may be performed without the user having to approach each product and/or product package. The user may simply update a single product and/or product package and then let the proximity-based devices automatically perform the remaining updates. The example in FIG. 3 is intended only as an example as fewer or more products and/or product packages may be updated according to the update cascading configuration 300.

Figure 4:
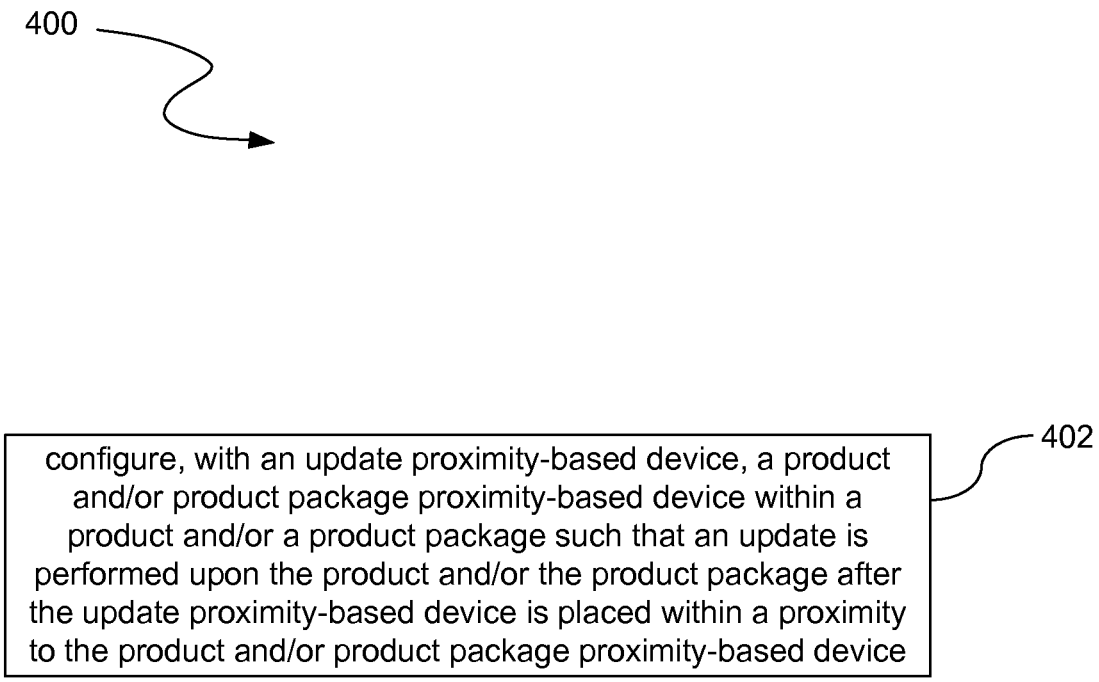
FIG. 4 illustrates a process that is utilized to provide a proximity-based update.

FIG. 4 illustrates a process 400 that is utilized to provide a proximity-based update. At a process block 402, the process 400 configures, with an update proximity-based device, a product and/or product package proximity-based device within a product and/or a product package such that an update is performed upon the product and/or the product package after the update proximity-based device is placed within a proximity to the product and/or product package proximity-based device.

The update described herein may occur with or without user commands. For example, when a user moves a device 102 in FIG. 1 within proximity of a product and/or package 104, the sensor and/or transceiver 106 may automatically update content stored on the sensor and/or transceiver 108 without a user command. In another configuration, the device 102 waits for a user command before updating content stored on the sensor and/or transceiver 108.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A method comprising:
wirelessly sending an update, from an update proximity-based device within a mobile computing device, to a first product package proximity-based device within a corresponding first product package when the update proximity-based device is placed within a first proximity to the first product package proximity-based device, the update comprising code with an instruction for the first product package proximity-based device to send the update to a second product package proximity-based device within a corresponding second product package, the update comprising a content life cycle rule that automatically prevents transmission of content associated with the corresponding first product package to the second product package proximity-based device after expiration of a static period of time;

determining, at the first product package proximity-based device, that the static period of time has not expired; and upon determining that the static period of time has not expired, wirelessly sending the update, from the first product package proximity-based device, to the second product package proximity-based device when the first product package proximity-based device is placed within a second proximity to the second product package proximity-based device.

2. The method of claim 1, wherein the first product package proximity-based device deletes the content after the static period of time.

3. The method of claim 1, wherein the update proximity-based device is a Near Field Communication transmitter.

4. The method of claim 1, wherein the first product package proximity-based device is a Near Field Communication transmitter.

5. The method of claim 1, wherein the first proximity and the second proximity are predefined.

6. The method of claim 1, wherein the update is performed in an environment selected from the group consisting of: a factory and a store.

7. The method of claim 1, wherein the second product package proximity-based device is a Near Field Communication transmitter.

8. A method comprising:

wirelessly sending an update, from an update proximity-based device within a mobile computing device, to a first product package proximity-based device within a corresponding first product package when the update proximity-based device is placed within a first proximity to the first product package proximity-based device, the update comprising code with an instruction for the first product package proximity-based device to send the update to a second product package proximity-based device within a corresponding second product package, the update comprising a content life cycle rule that automatically prevents transmission of content associated with the corresponding first product package to the second product package proximity-based device after expiration of a dynamic period of time;

determining, at the first product package proximity-based device, that the dynamic period of time has not expired; and upon determining that the dynamic period of time has not expired, wirelessly sending the update, from the first product package proximity-based device, to the second product package proximity-based device when the first product package proximity-based device is placed within a second proximity to the second product package proximity-based device.

9. The method of claim 8, wherein the first product package proximity-based device deletes the content after the dynamic period of time.

10. The method of claim 8, wherein the update proximity-based device is a Near Field Communication transmitter.

11. The method of claim 8, wherein the first product package proximity-based device is a Near Field Communication transmitter.

12. The method of claim 8, wherein the second product package proximity-based device is a Near Field Communication transmitter.

13. The method of claim 8, wherein the first proximity and the second proximity are predefined.

14. The method of claim 8, wherein the update is performed in an environment selected from the group consisting of: a factory and a store.

* * * * *